(12) United States Patent
Schumacher

(10) Patent No.: US 7,695,352 B2
(45) Date of Patent: Apr. 13, 2010

(54) TOOL-MOUNTING ATTACHMENT

(75) Inventor: Hermann Schumacher, Reutlingen (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 11/848,945

(22) Filed: Aug. 31, 2007

(65) Prior Publication Data

US 2008/0057846 A1    Mar. 6, 2008

(30) Foreign Application Priority Data

Sep. 1, 2006    (DE) .................. 20 2006 013 890 U

(51) Int. Cl.
*B24B 41/00*    (2006.01)

(52) U.S. Cl. .................. 451/342; 451/351; 451/540

(58) Field of Classification Search ......... 451/540–551, 451/340, 342, 344, 351, 356, 357, 212, 421, 451/431, 441

See application file for complete search history.

(56) References Cited

U.S. PATENT DOCUMENTS 3,667,169 A * 6/1972 MacKay, Jr. ............ 451/511
4,920,702 A   5/1990 Kloss et al.
5,058,909 A  10/1991 Rudolf et al.
6,099,397 A * 8/2000 Wurst .................... 451/344
6,206,766 B1 * 3/2001 Schuller ................. 451/259
6,796,888 B2 * 9/2004 Jasch .................... 451/342
6,945,862 B2  9/2005 Jasch et al.
2005/0153640 A1 * 7/2005 Stein et al. .............. 451/494

FOREIGN PATENT DOCUMENTS

| DE | 3902874 A1  | 8/1990  |
| DE | 4205977 A1  | 9/1993  |
| DE | 19945060 A1 | 3/2001  |
| DE | 20110242 U1 | 10/2001 |
| DE | 10329826 A1 | 1/2005  |
| GB | 2357054 A   | 6/2001  |

* cited by examiner

*Primary Examiner*—Dung Van Nguyen
(74) *Attorney, Agent, or Firm*—St. Onge Steward Johnston & Reens LLC

(57) ABSTRACT

The invention discloses a tool having a work plate which has a mounting area with a mounting opening for mounting the plate on a drive shaft of a drive, preferably an oscillatory drive, the mounting opening being suitably configured for being seated on the drive shaft, wherein centering elements, projecting toward the drive shaft, are provided for centering the tool on the drive shaft.

17 Claims, 1 Drawing Sheet

TOOL-MOUNTING ATTACHMENT

CROSS-REFERENCE TO RELATED APPLICATIONS

This application claims Convention priority of German utility model application serial number 20 2006 013 890.0 filed on Sep. 1, 2006, the subject matter of which is fully incorporated by reference herewith.

BACKGROUND OF THE INVENTION

The present invention relates to a tool having a work plate which comprises a mounting area with a mounting opening for mounting the plate on a drive shaft of a drive, preferably an oscillating drive, the mounting opening being configured for being seated on the drive shaft.

A tool of that kind is known from U.S. Pat. No. 6,945,862.

The known tool is provided with a work plate comprising a mounting area with a mounting opening to be mounted on a drive shaft of an oscillating drive. The mounting opening is adapted for being seated in form-locking engagement on a plurality of flanks provided on the end of the drive shaft, and comprises curved sections adapted to the shape of the flanks. The number of curved sections is equal to twice the number of the flanks on the drive shaft.

It is possible in this way to mount and fix the tool on the drive shaft in different angular positions. This is of particular advantage in cases where the respective tool has a an oblong shape, for example, for the purpose of performing sawing operations using an edge arranged opposite the mounting opening.

In order to guarantee such adjustability, the number of curved sections provided on the mounting opening must be equal to an integral multiple of the number of flanks or driver elements provided on the drive shaft. If four driver elements, for example, are provided on the drive shaft, then the number of curved sections on the mounting opening must be at least eight in order to permit the position of the tool to be adjusted in steps of 45°. If finer adjustment, for example by steps of 30°, is required, the number of curved sections on the mounting opening would already be increased to twelve.

In the case of a relatively small diameter of the mounting opening it is, however, difficult to produce such a great number of curved sections, adapted to the corresponding driver elements of the drive shaft, and to adapt them to the driver elements of the drive shaft.

In particular when the tool is made from a relatively soft or ductile material, such as aluminum, sufficiently precise production of a the mounting opening with a great number of curved sections can hardly be guaranteed. Moreover, designing the mounting opening with a plurality of curved sections is no longer possible, if only for reasons of geometry, when a greater number of curved sections is required.

Although in that case it would be possible in principle to make the curved sections a little shorter, sufficiently precise seating of the tool on the drive shaft could no longer be guaranteed in that case.

SUMMARY OF THE INVENTION

It is a first object of the present invention to improve a tool of the before-mentioned kind so that precise seating of the mounting opening of the tool on the drive shaft is guaranteed even under unfavorable conditions.

It is a second object of the invention to disclose an oscillating tool that is configured for working with such a tool.

According to the invention these and other objects are achieved with a tool as mentioned at the outset in that centering elements are provided on the work plate projecting toward the drive shaft for centering the tool on the drive shaft.

The object of the invention is perfectly achieved in this way.

The invention thereby achieves safe centering of the tool on the drive shaft in cases where such safe centering cannot be achieved by the mounting opening alone.

Consequently, the configuration of the mounting opening can be selected irrespective of the need to accurately center the tool on the drive shaft. This provides greater freedom in designing the mounting opening. In addition, the mounting opening may be provided with numerous curved sections that allow adjustment of the position of the drive shaft by small angular steps, by interaction with associated driver elements provided on the drive shaft.

According to an advantageous further development of the invention, the mounting opening is designed for being seated in form-locking engagement on driver elements that project from the drive shaft.

In this way, safe power transmission from the drive shaft to the tool is achieved even under very unfavorable conditions and high loads.

According to a further embodiment of the invention, the centering elements are designed as recesses in the mounting area whose edges form centering edges that project to the outside.

Preferably, the centering elements are sized and arranged so that they are capable of being seated in centered fashion on the outer surface of a flange provided on the end of the drive shaft.

This provides an especially simple form and configuration of the centering elements, and safe centering.

According to an advantageous further development of the invention, the mounting opening comprises a plurality of curved sections in symmetrical arrangement, designed for being seated on the associated driver elements of the drive shaft in form-locking engagement.

This guarantees positive power transmission from the drive shaft to the tool. The configuration of the mounting opening with curved sections simultaneously guarantees relatively uniform power transmission.

According to a further embodiment of the invention, the centering elements take the form of punched-out openings.

Configuring the elements in that way makes the production process especially simple and inexpensive.

According to a further embodiment of the invention, the mounting area is bent off at an angle relative to the work plate.

It is possible in this way to grind working surfaces directly by the end face of the work plate, without that operation being obstructed by an arrangement by which the tool is mounted on the drive shaft.

According to a further embodiment of the invention, the work plate is configured as a grinding disk, or comprises means for mounting a grinding material.

According to an alternative embodiment of the invention, the work plate is configured as a saw blade.

In combination with an oscillating drive used for driving the tool, the system then advantageously permits a plurality of grinding and sawing operations to be performed.

The object of the invention is further achieved, with respect to the oscillating tool, by an oscillating tool having a drive shaft that preferably is driven to oscillate about its longitudinal axis, and by a tool received on the end of the drive shaft, which tool comprises the afore-mentioned centering elements, projecting toward the drive shaft, for centering the tool on the drive shaft.

According to a further development of the oscillating tool, the tool can be clamped relative to the drive shaft by a fastener or tension element.

The tool can then be rapidly mounted and/or rapidly detached on or from the drive shaft, without any need for any auxiliary tools such as wrenches or the like.

According to a further development of the invention, the fastener or tension element is countersunk in an area that is bent off relative to the work plate.

It is possible in this way to work a working surface directly by the end face of the work plate, without any obstruction by the arrangement used for mounting the tool on the oscillating tool.

According to another embodiment of the invention, a first number of flanks is formed on the outer end of the drive shaft, with a second number of associated curved sections, being an integral multiple of the first number, provided on the mounting opening of the tool.

This permits the tool to be mounted on the drive shaft in different angular positions. By providing a correspondingly high number of curved sections on the mounting opening, compared with the flanks on the drive shaft, adjustment in fine angular steps can be achieved. Even when the mounting opening comprises a plurality of curved sections, precise centering of the tool on the oscillating drive is achieved by the additional centering elements.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of preferred embodiments of the invention, with reference to the drawing. In the drawings.

DETAILED DESCRIPTION OF THE INVENTION

Figure 1:
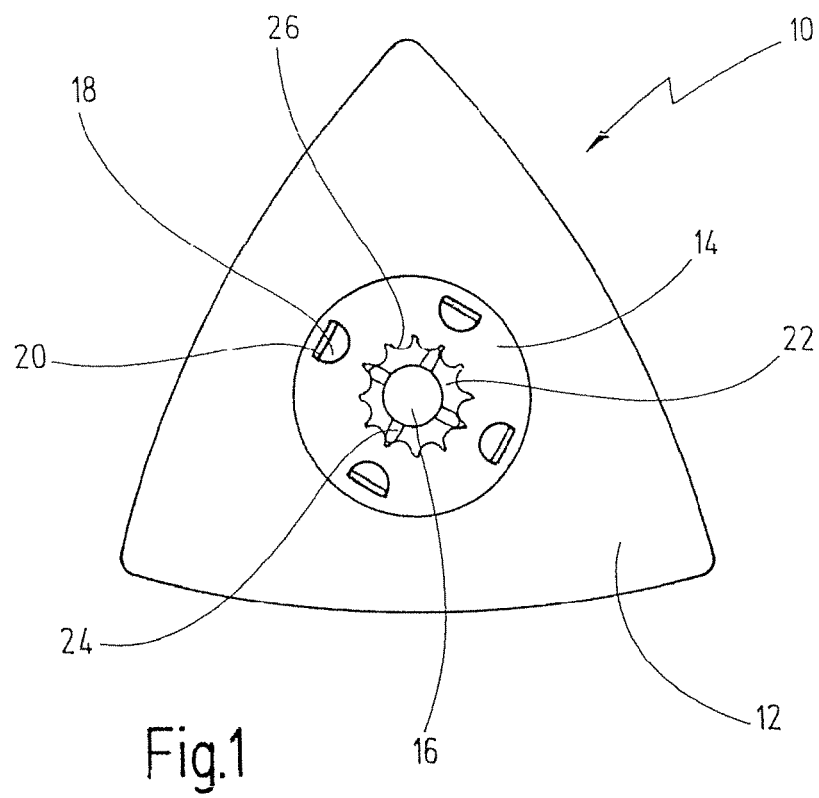
FIG. 1 shows a top view of a tool according to the invention, fitted on one end of a drive shaft (without tension element) that can be driven to oscillate.

FIG. 1 shows a top view of a tool according to the invention in the form of a triangular grinding disk, indicated generally by reference numeral 10.

To enhance understanding, the drawing additionally shows at its center the axial end of a drive shaft 16 of an oscillating drive on which the mounting opening 22 of the tool 10 can be mounted in form-locking engagement.

Figure 2:
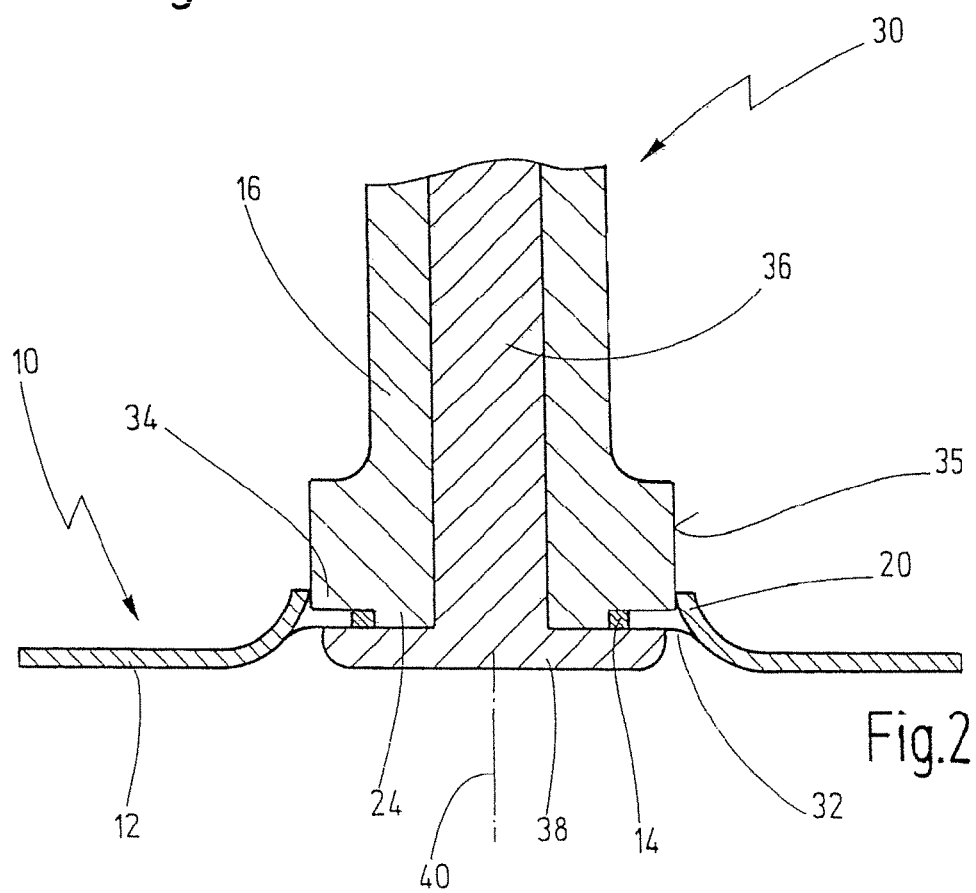
FIG. 2 shows an enlarged view of a section through the tool according to FIG. 1, being tensioned by means of a tension element against the end of the drive shaft that can be set into oscillating movement.

The tool 10 comprises a plane work plate 12 which preferably is provided with means for fastening an abrasive, such as a Velcro tape, which serves for fastening an abrasive in a detachable way. The work plate 12 is provided at its center with a mounting area 14 which is configured in such a way that a bent-off portion 32 projects over the remaining part of the work plate 12 (compare FIG. 2).

In the middle of the mounting area 14, there is provided a mounting opening 22 having a plurality of curved sections 26 formed symmetrically on the mounting opening 22, the arrangement comprising a total of twelve curved sections 26 in the form of rounded tips. Driver elements 24, corresponding to those curved sections 26, are provided on the outer end of the drive shaft 16 of an associated oscillating drive. However, only four driver elements 24 are arranged on the drive shaft 16 at uniform angular spacings of 90° one relative to the other so that the tool 10 can be mounted on the drive shaft 16 in different angular positions, at increments of 30° each. In the mounted condition, the driver elements 24, being configured as rounded flanks, are each in engagement with a corresponding curved section 26 of the mounting opening 22.

In order to ensure safe centering in the case of a configuration of that kind, the mounting area 14 of the tool 10 comprises a total of four centering elements 18 which are set off one from the other at angular spacings of 90°.

The centering elements 18 are configured and arranged in such a way that they abut on the outer wall of the drive shaft 16, the end of which is provided with a cylindrical flange 34, by a centering edge 20 projecting from each of the centering elements. The centering edges 20 of the centering elements 18 therefore engage the cylindrical outer surface 35 of the flange 34 of the drive shaft 16 in concentric relationship.

This guarantees safe centering of the tool 10 on the drive shaft 16 of the oscillating drive independently of the mounting opening 22.

A tension element 36, which is slidably held in a central bore of the drive shaft 16 and the head 38 of which is recessed in the bent-off portion 32, relative to the work plate 12, serves for fixing the tool 10 on the drive shaft 16.

That tension element or fastener 36 is held in the hollow drive shaft by suitable driver elements (not shown) and is retained by spring tension in the way known in principle from U.S. Pat. No. 5,058,909, for example, which is fully incorporated by reference herewith. For detaching the tension element, a clamping lever (not shown) is thrown over, against the prestress of a set of springs, with the result that the tension element 36 can be pushed to the outside and can then easily be pulled off.

The oscillating tool 30, formed by the combination of the oscillating drive with the mounted tool 10, permits in particular grinding and sawing operations to be carried out in a particularly favorable way.

For carrying out such operations, the oscillating drive sets the drive shaft 16 into reciprocating oscillating movement about its longitudinal axis 40, in the way known as such (compare for example U.S. Pat. No. 4,920,702 which is fully incorporated by reference), at a high frequency of approximately 5,000 to 30,000 oscillations per minute and a small angle of swing of between approximately 0.5° and 7°.

What is claimed is:
1. A tool comprising:
a work plate having a mounting area;
a mounting opening provided within said mounting area and being configured for releasably mounting said work plate on a drive shaft of an oscillatory drive; and
a plurality of centering elements arranged around said mounting opening projecting from said work plate toward said drive shaft for centering the tool on said drive shaft;
wherein said centering elements are configured as recesses in said mounting area, said recesses comprising centering edges that project to the outside; and
wherein said centering elements are arranged on said work plate concentrically to said mounting opening and are configured for abutting against an outer surface of said drive shaft when said tool is attached to said drive shaft, thereby centering said tool on the outer surface of said drive shaft.

2. The tool of claim 1, wherein said mounting opening is configured for being seated in form-locking engagement on driver elements projecting from said drive shaft.

3. The tool of claim 1, wherein said centering elements are sized and arranged so that they are centered on an outer surface of said end of said drive shaft.

4. The tool of claim 1, wherein said mounting opening comprises a plurality of curved sections which are configured for seating on mated driver elements provided on said drive shaft in form-locking engagement.

5. The tool of claim 1, wherein said mounting area is bent off at an angle relative to said work plate.

6. The tool of claim 1, wherein said work plate is configured as a grinding disk.

7. The tool of claim 1, wherein said work plate comprises a Velcro tape for mounting a releasable grinding material.

8. The tool of claim 1, wherein said work plate is configured as a grinding disk.

9. The tool of claim 1, wherein said work plate is configured as a saw blade.

10. A tool comprising:
a work plate having a mounting area;
a mounting opening provided within said mounting area and being configured for releasably mounting said work plate on a drive shaft of an oscillatory drive; and
a plurality of centering elements arranged around said mounting opening projecting from said work plate toward said drive shaft for centering the tool on said drive shaft;
wherein said centering elements are configured as openings punched-out from said work plate; and
wherein said centering elements are arranged on said work plate concentrically to said mounting opening and are configured for abutting against an outer surface of said drive shaft when said tool is attached to said drive shaft, thereby centering said tool on the outer surface of said drive shaft.

11. An oscillating tool comprising
a drive shaft that is oscillatingly driven about a longitudinal axis thereof;
a tool received on an end of said drive shaft;
wherein said tool comprises:
a work plate having a mounting area;
a mounting opening provided on said mounting area and being configured for releasably mounting said work plate on a drive shaft of an oscillatory drive; and
a plurality of centering elements arranged around said mounting opening projecting from said work plate toward said drive shaft for centering said tool on said drive shaft;
wherein said centering elements are configured as openings punched-out from said work plate; and
wherein said centering elements are arranged on said work plate concentrically to said mounting opening and are configured for abutting against an outer surface of said drive shaft when said tool is attached to said drive shaft, thereby centering said tool on the outer surface of said drive shaft.

12. The oscillating tool of claim 11, further comprising a fastener for clamping said tool against said end of said drive shaft.

13. The oscillating tool of claim 12, wherein said work plate comprises a bent-off region for receiving said fastener in a countersunk configuration.

14. The oscillating tool of claims 11, wherein drive shaft comprises a first number of flanks being provided on an outer end of said drive shaft; and wherein said mounting opening of said tool comprises a second number of curved sections mated to said flanks of said drive shaft and being an integral multiple of said first number.

15. The oscillating tool of claim 11, wherein said work plate comprises a Velcro tape for mounting a releasable grinding material.

16. The oscillating tool of claim 11, wherein said work plate is configured as a grinding disk.

17. The oscillating tool of claim 11, wherein said work plate is configured as a saw blade.

* * * * *